United States Patent [19]

Chao et al.

[11] Patent Number: 5,146,515
[45] Date of Patent: Sep. 8, 1992

[54] STRUCTURE OF LENS COMBINATION FOR OPTICAL FIBER FINE DISPLACEMENT DETECTING SYSTEM

[75] Inventors: Zu-Wen Chao; Jinn T. Wu, both of Hsinchu, Taiwan

[73] Assignee: Industrial Technology Research Institute, Hsinchu, Taiwan

[21] Appl. No.: 610,682

[22] Filed: Nov. 8, 1990

[51] Int. Cl.$^5$ .............................. G02B 6/32
[52] U.S. Cl. ........................................ 385/35
[58] Field of Search ................. 350/96.18; 385/35

[56] References Cited

U.S. PATENT DOCUMENTS

| | | | |
|---|---|---|---|
| 4,767,171 | 8/1988 | Keil et al. | 385/35 |
| 4,795,227 | 1/1989 | Chande | 350/96.18 |
| 4,796,969 | 1/1989 | Fantone | 385/35 |
| 4,798,428 | 1/1989 | Karim et al. | 350/96.18 |
| 4,997,250 | 3/1991 | Ortiz | 350/96.18 |
| 4,997,251 | 3/1991 | Hofbauer | 350/96.18 |

Primary Examiner—John D. Lee
Assistant Examiner—Robert E. Wise
Attorney, Agent, or Firm—Cushman, Darby & Cushman

[57] ABSTRACT

A lens combination set in front of an optical fiber terminal head of an optical fiber fine displacement detecting system to focus a real image of the optical fiber terminal head so as to extend the mounting range of the head relative to the object in detection and avoid any possible damage due to collision of the object with the head. The lens combination focuses the light rays from the optical fiber terminal head to form a real image outside the lens combination. The reflected light rays from the object mounted around the real image are focused by the lens combination and sent back to the detecting system through the optical fiber terminal head. Therefore, sufficient safety range is obtained between the lens combination and the object in detection without affecting the normal operation of the detecting system.

6 Claims, 3 Drawing Sheets

STRUCTURE OF LENS COMBINATION FOR OPTICAL FIBER FINE DISPLACEMENT DETECTING SYSTEM

BACKGROUND OF THE INVENTION

The present invention is related to a lens assembly and more particularly to a lens combination for connection to the optical fiber terminal head of an optical fiber fine displacement detecting system so as to extend the effective working distance between the detecting head of a detecting system and an object in detection.

The layout of an optical fiber fine displacement detecting system with which the present invention is concerned is illustrated in FIG. 4A. A bundle of optical fibers F is used as a detecting head, part of which is light emitting optical fibers F1 which transfer monochromatic light from light source L and project the light onto the surface P of an object in detection, the other part of which is light receiving optical fibers F2 which pick up the reflected monochromatic light from the surface P of an object in detection, transfer the light, and expose the light onto a photodetector D which produces correspondingly an electrical signal the voltage of which is measured for determination of the distance d between the object in detection and the optical fiber terminal head X. FIG. 4B illustrates a typical performance curve associated with the afore-said system, in which the front part of the curve contains a linear segment, within which the photoelectric voltage is linearly proportional to the distance d between the optical fiber terminal head and the object. This range of linearity is the section ST on the abscissa in FIG. 4B and point S is approximately 20 μm to object (0) and point T is approximately 120 μm to object (0). The center M of the section ST is taken as an operational center point. OM is the working distance that the optical fiber head shall be mounted in front of the object and is approximately 70 μm. Since this mounting distance is so short, the optical fiber detecting head as well as the object in detection may be damaged due to mutual contact during installation or operation.

SUMMARY OF THE INVENTION

The present invention solves the afore-said problem by mounting a lens combination in a position between the optical fiber detecting head and the object in detection so that the working distance between the optical fiber detecting head and the object in detection can be effectively extended without affecting the performance of the detecting system. The lens combination is mounted in front of the optical fiber terminal head so that a real image of the optical fiber terminal head can be formed in further front of the lens combination, therefore the light from the emitting optical fibers is focused on the object in front of the lens combination. The light reflected from the object is focused on the receiving optical fiber terminal head through the lens combination for further transmission to the detecting system.

DETAILED DESCRIPTION OF THE PREFERRED EMBODIMENT

Figure 1:
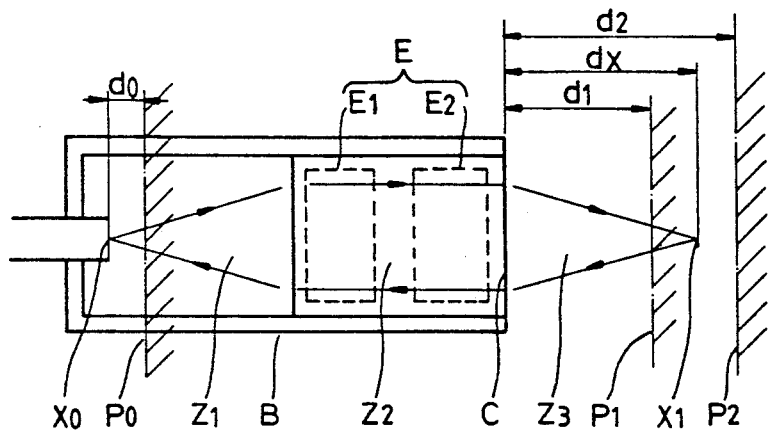
FIG. 1 is a schematic drawing illustrating the functional blocks of the present invention.

Referring to FIG. 1, optical fiber terminal head X0 and lens combination E are relatively mounted in the housing B so that a real image X1 of optical fiber terminal head X0 is formed at distance dx from the outer side C of the lens combination. Object may be set at P1 or P2 near real image X1. The linearity of the measurement made from the reflected light from object at P1 or P2 is approximately equal to that from object at P0 which would be of distance do from X0. P1 or P2 is far from the outer side C of the lens combination, its mounting distance d1 or d2 is much larger than the mounting distance do employed in the prior art. For example, d1 could be 7000 μm through proper design, while do is only 70 μm, as mentioned previously.

According to the present invention, the lens combination E comprises two lens sets E1 and E2, in which the first lens set E1 turns light rays Z1 emitting from optical fiber terminal head X0 into parallel light rays Z2, and the second lens set E2 focuses parallel light rays Z2 into converging light rays to form the image Z3. Each lens component of the lens combination is coated with a layer of anti-reflection film to improve light flux.

Figure 2:
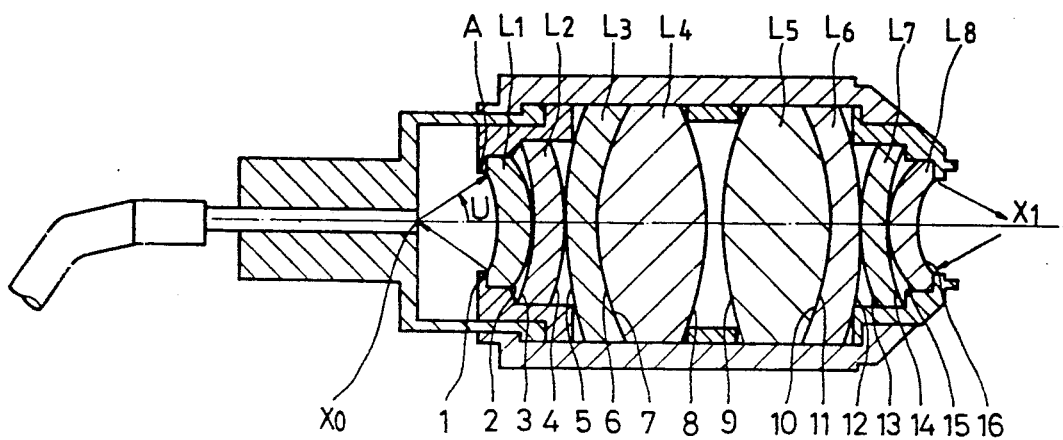
FIG. 2 is a sectional view of a lens combination embodying the present invention.

FIG. 2 illustrates a lens combination embodying the present invention comprising 8 pieces of lens and being properly arranged in front of optical fiber terminal head X0. The lens surfaces are numbered in proper order from 1 to 16. The first lens L1 is a concave-convex lens. The second lens L2 is a concave-convex lens and is in close contact with L1. The third lens L3 is a convex-concave lens and is in close contact with L2. The fourth lens L4 is a biconvex lens cemented to the third lens L3. The fifth lens L5 is a biconvex lens located near the fourth lens L4 with an air spacing in between. The sixth lens is a concave-convex lens cemented to the fifth lens L5. The seventh lens L7 is a convex-concave lens and is in close contact with L6. The eight lens L8 is a convex-concave lens and is in close contact with L7.

The optical performance of the present invention is outlined hereinafter. Optical fiber terminal head X0 is set at the center of the curvature of surface 1 of the first lens L1. The light with maximum angle of inclination U relative to the optical axis A and emitting from optical fiber terminal head X0 can enter the first lens within its rim. The first lens L1 and the second lens L2 reduce the angle of inclination U. The third lens L3 and the forth lens L4 jointly reduce spherical aberration (these two lenses can be replaced by one single non-spherical lens) and turn the light rays from the second lens L2 into horizontal light rays in parallel with the optical axis A. The fifth lens L5 and the sixth lens L6 jointly reduce spherical aberration (these two lenses can be replaced by one single nonspherical lens) and turn parallel light rays into converging rays (not shown). The seventh lens L7 increases the angle of inclination of the light rays from the sixth lens L6. The eighth lens L8 further increases the angle of inclination of the light rays from the seventh lens L7 to an angle of inclination U', with U'=U. A real image X1 is formed at the curvature center of the surface 16. The following table is obtained from an application of the afore-said preferred embodiment of the present invention.

TABLE I

| Lens | Lens surface | Thickness to previous surface (mm) | Radius of Curvature (mm) | Material |
|---|---|---|---|---|
| L1 | 1 | 0 | −11.88 | SF11 |
|  | 2 | 3 | −9.49 |  |
|  | 3 | 0 | −26.24 |  |
| L2 | 4 | 4 | −19.30 | SF11 |
|  | 5 | 0 | 107.79 |  |
| L3 | 6 | 3 | 30.63 | SF11 |
|  | 7 | 0 | 30.63 |  |
| L4 | 8 | 14 | −30.63 | BK7 |
|  | 9 | 1 | 30.63 |  |
| L5 | 10 | 14 | −30.63 | BK7 |
|  | 11 | 0 | −30.63 |  |
| L6 | 12 | 3 | −107.79 | SF11 |
|  | 13 | 0 | 19.3 |  |
| L7 | 14 | 4 | 26.24 | SF11 |
|  | 15 | 0 | 9.49 |  |
| L8 | 16 | 3 | 11.88 | SF11 |

As indicated in Table I, the lenses L1 to L4 are arranged in symmetrical manner with the lenses L8 to L5 so that a real image of the optical fiber terminal head can be obtained. The bundle of optical fibers has a diameter of 2 mm and contains 1400 optical fibers each of which has a diameter of 50 μm (with numerical aperture of 0.4). The system utilizes laser diode as a light source which emits monochromatic light of wave-length 0.8 μm.

Figure 3:
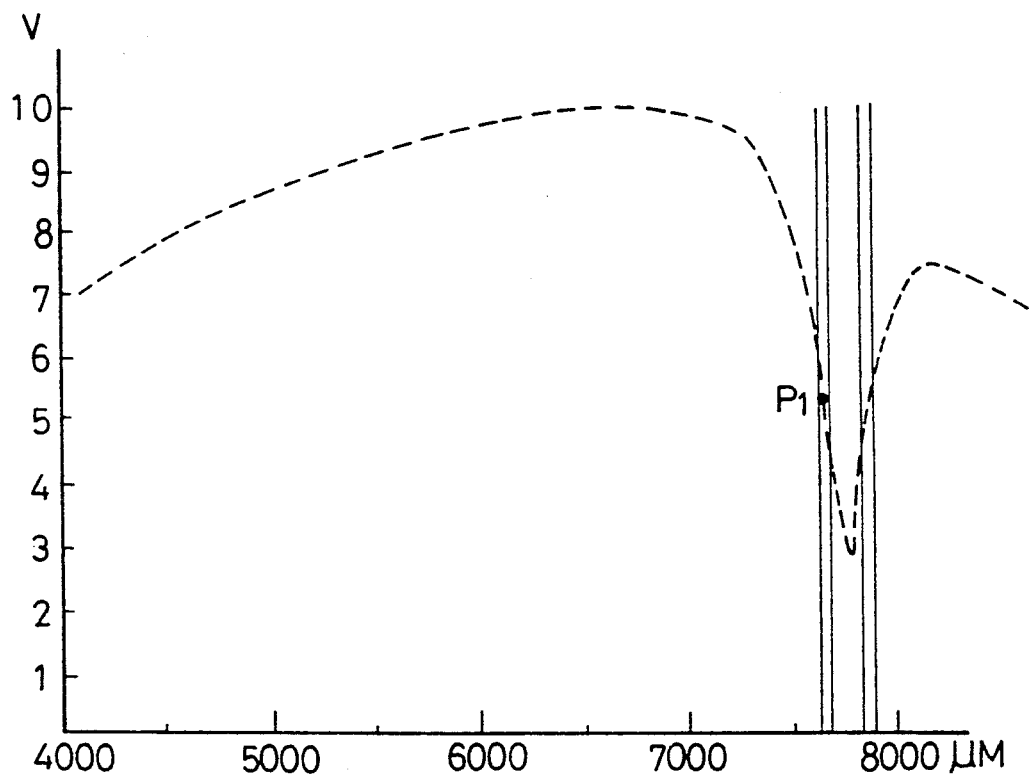
FIG. 3 is a chart of performance curve associated with the present invention.
Figure 4A:
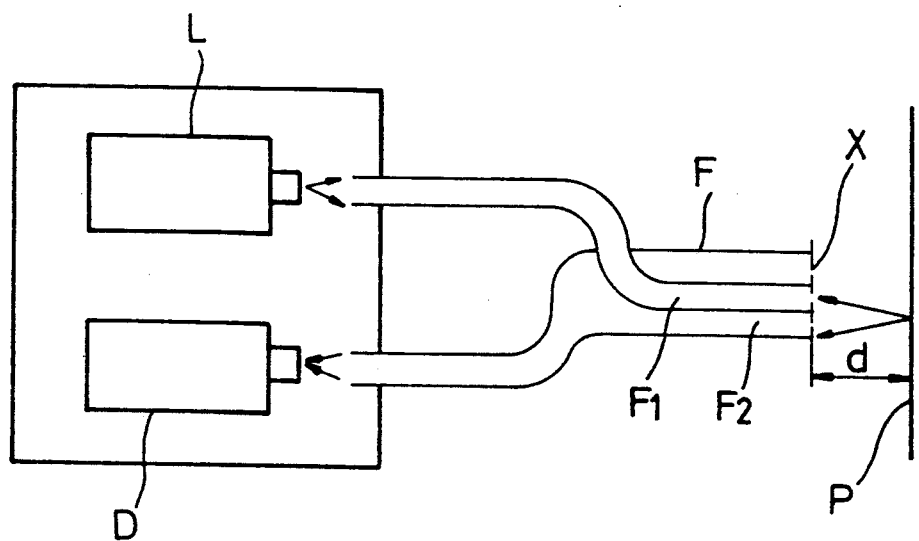
FIG. 4A is a schematic drawing illustrating the structure of an optical fiber fine displacement detecting system of the prior art.
Figure 4B:
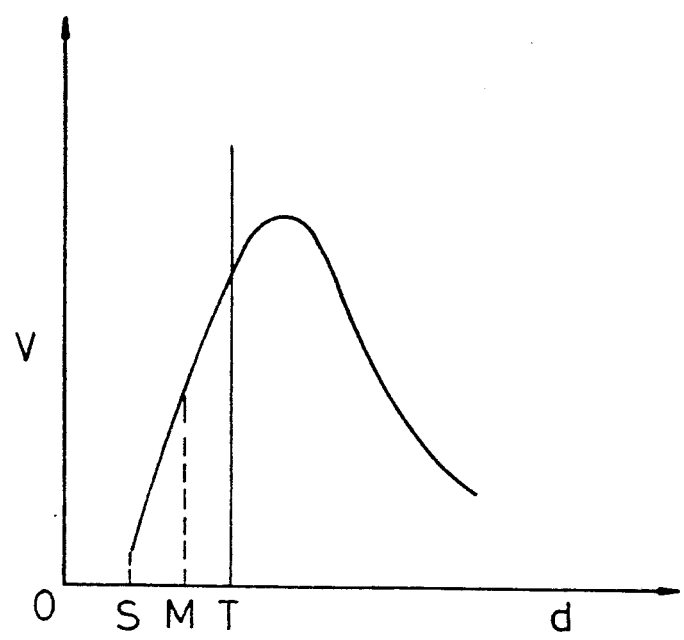
FIG. 4B is a chart of performance curve associated with the prior art.

FIG. 3 illustrates a performance curve obtained from the present invention. As illustrated, the working center position P1 for linearity measurement is at 7630 μm, and the measuring range of best linearity is 60 μm. According to test, the sensitivity is 31 μm/V. While in the prior art, the center working distance is 70 μm, the measuring range of best linearity is 60 μm, and the sensitivity is 13 μm/V.

From the above comparison, it is apparent that the working distance according to the present invention can be extended 110 times over the prior art while the sensitivity is maintained within same level. Therefore, the present invention can effectively extend the working (mounting) distance of the detecting head of a detecting system without affecting the sensitivity of the system.

In the afore-said preferred embodiment, the lens combination comprises two sets of lenses arranged in symmetry with each other. As an alternate form of the present invention, the arrangement of the lenses may be changed through non-symmetrical design according to requirement without affecting the effect of the lens combination.

What is claimed is:

1. An apparatus for use with an optical fiber fine displacement detecting system having a detecting head, the apparatus comprising:

focusing means, disposed a first predetermined distance from the detecting head, for first focusing light rays emitting from the detecting head to form a real image of the detecting head at a second predetermined distance from the detecting head, the real image being formed to enable the detecting head to be positioned at a third distance from an object being examined by the optical fiber fine displacement detecting system, and for second focusing a portion of the light rays which are reflected by the object positioned at the third predetermined distance from the detecting head onto the detecting head; and housing means, adaptable to be attached to the detecting head, for positioning the focusing means at the first predetermined distance away from the detecting head.

2. An apparatus according to claim 1, wherein the focusing means comprises a plurality of lenses.

3. An apparatus according to claim 2, wherein the plurality of lenses comprises first and second lens configurations, the first lens configuration being nearer to the detecting head than is the second lens configuration, the first lens configuration causing the light rays propagating towards the object to be substantially parallel to each other and causing the portion of the light rays reflecting from the object to converge toward the detecting head, the second lens configuration causing the substantially parallel light rays to converge at the second predetermined distance to form the real image of the detecting head and causing the portion of the light rays reflecting from the object to be substantially parallel to each other.

4. An apparatus as in claim 3, wherein the first and the second lens configurations are arranged such that the real image formed is substantially equal in size to the detecting head.

5. An apparatus as in claim 2, wherein the real image formed is substantially equal in size to the detecting head.

6. An apparatus as in claim 1, wherein the real image formed is substantially equal in size to the detecting head.

* * * * *